(12) United States Patent
Henderson

(10) Patent No.: US 11,866,621 B1
(45) Date of Patent: Jan. 9, 2024

(54) PRE-FORMED ADHESIVE STRIP APPARATUS AND METHODS OF MAKING AND USING THE SAME

(71) Applicant: Kenneth Ray Henderson, Creedmoor, NC (US)

(72) Inventor: Kenneth Ray Henderson, Creedmoor, NC (US)

(*) Notice: Subject to any disclaimer, the term of this patent is extended or adjusted under 35 U.S.C. 154(b) by 0 days.

(21) Appl. No.: 18/117,128

(22) Filed: Mar. 3, 2023

(51) Int. Cl.
*B32B 3/04* (2006.01)
*C09J 7/20* (2018.01)
*B32B 7/12* (2006.01)
*B32B 7/06* (2019.01)

(52) U.S. Cl.
CPC ............ *C09J 7/20* (2018.01); *B32B 3/04* (2013.01); *B32B 7/06* (2013.01); *B32B 7/12* (2013.01); *B32B 2250/05* (2013.01); *C09J 2203/358* (2020.08); *C09J 2301/122* (2020.08); *C09J 2301/312* (2020.08); *C09J 2301/502* (2020.08); *Y10T 428/14* (2015.01)

(58) Field of Classification Search
CPC .... B32B 3/04; B32B 7/12; B32B 7/06; B32B 2250/05; C09J 7/20; Y10T 428/14
See application file for complete search history.

(56) References Cited

U.S. PATENT DOCUMENTS

| | | | |
|---|---|---|---|
| 4,650,706 A * | 3/1987 | Emmel | C09J 7/20 428/354 |
| 4,742,913 A * | 5/1988 | Emmel | A47L 25/005 206/460 |
| 10,716,455 B1 * | 7/2020 | Bookland | B32B 27/08 |
| 2002/0061380 A1 * | 5/2002 | Corpus | B32B 29/06 428/40.1 |
| 2004/0261209 A1 * | 12/2004 | McKay | A47L 23/266 15/215 |
| 2013/0142975 A1 * | 6/2013 | Wallace | B32B 7/06 428/355 R |

* cited by examiner

*Primary Examiner* — Scott W Dodds
(74) *Attorney, Agent, or Firm* — Ashley D. Johnson; Dogwood Patent and Trademark Law

(57) ABSTRACT

The invention is an apparatus that allows individual adhesive strips to be easily and efficiently accessed by a medical professional. Specifically, the apparatus is defined by a series of adhesive strips that are offset and overlayed. Each adhesives strip includes a folded edge that allows a medical professional to grasp an individual adhesive strip, remove it from the adjacent strip, and use it for a particular application. When an additional adhesive strip is needed, the medical professional can repeat the process with the next (e.g., top) adhesive strip until all of the strips have been used.

17 Claims, 5 Drawing Sheets

PRE-FORMED ADHESIVE STRIP APPARATUS AND METHODS OF MAKING AND USING THE SAME

FIELD OF THE INVENTION

The presently disclosed subject matter is directed to an apparatus comprising a series of pre-formed adhesive strips and to methods of making and using the disclosed apparatus.

BACKGROUND OF THE INVENTION

In the healthcare field, adhesive strips are commonly used for a variety of applications, such as securing tubing on the skin of a patient, keeping clothing or other items out of the way during a procedure, holding sterile mats or adhesive materials against the skin, securing machinery tubing or other elements, and the like. To access the adhesive strips and have them available on hand, the medical professionals commonly pre-stick adhesive strips to their skin or clothing so that they are easily accessible when needed. Alternatively, the medical professional can time-consumingly reach for and position individual pieces of adhesive strips as they are needed. However, these prior art methods are time-consuming and waste valuable time that the medical professionals can use to interact with and care for patients. In addition, tape and other adhesive materials used in operating rooms are often dirty and contaminated from repeated use on multiple patients. In addition, many professionals that handle the tape rolls are often non-compliant with hand hygiene. Moreover, the adhesive materials are often dropped on the floor, where they are in contact with dirt and pathogens. Thus, the use of conventional adhesive materials increases exposure to pathogens and the risk of infection. It would therefore be valuable to have an apparatus that provides adhesive strips as a unit, allowing the medical professional to access and use the strips without any preparation and without having to access individual strips one at a time.

SUMMARY OF THE INVENTION

In some embodiments, the presently disclosed subject matter is directed to an apparatus comprising a plurality of pre-formed adhesive strips. Specifically, each adhesive strip defined by an upper non-adhesive surface and an opposed lower surface comprising an adhesive material. Each adhesive strip further includes a front edge and an opposed rear edge, wherein the rear edge comprises a fold that is non-adhesive on all faces of the fold and at least one side edge. Each adhesive strip is overlayed on an adjacent adhesive strip such that the adhesive bottom surface of the adhesive strip contacts and adheres to the top non-adhesive surface of the adjacent adhesive strip but the folds of the adhesive strip and the adjacent adhesive strip are not adhered together.

In some embodiments, the apparatus includes a support positioned on a bottom-most adhesive strip of the apparatus, the support comprising an upper adhesive surface and an opposed lower adhesive surface, whereby the upper adhesive surface is attached to the lower surface of the bottom-most adhesive strip of the apparatus.

In some embodiments, the side edges of each adhesive strip are aligned with the side edges of each adjacent adhesive strip.

In some embodiments, the rear edge of each adhesive strip is offset from the rear edge of each adjacent adhesive strip.

In some embodiments, the fold extends along a width of each adhesive strip.

In some embodiments, the fold is configured only on a corner of the rear edge of each adhesive strip.

In some embodiments, the fold is permanent (e.g., cannot be unfolded without damage to the strip).

In some embodiments, the fold is formed by joining a portion of the lower adhesive surface to another portion of the lower adhesive surface.

In some embodiments, each adhesive strip is sterile.

In some embodiments, each adhesive strip comprises a length of about 0.5-6 inches, a width of about 0.5-6 inches, and a thickness of about 0.01-0.5 inches.

In some embodiments, the fold makes up about 1 percent of a total surface area of each adhesive strip.

In some embodiments, the fold makes up about 1-50 percent of a total surface area of each adhesive strip.

In some embodiments, the apparatus includes 20, 30, 40, 50, or more adhesive strips.

In some embodiments, the presently disclosed subject matter is directed to a method of providing a series of adhesive strips for use on demand. Specifically, the method comprises grasping the tab of a topmost adhesive strip of the disclosed apparatus. The method includes applying pressure and pulling in an upward motion to break a bond between the adhesive on the lower surface of the topmost adhesive strip and the upper surface of the adjacent adhesive strip, thereby separating the topmost adhesive strip from the apparatus. The method includes applying the separated adhesive strip as needed, whereby the adhesive strips of the apparatus are provided for on demand use. The topmost strip is the strip on the very top of the apparatus (e.g., 10a of FIG. 7). The lowermost strip is the strip on the very bottom of the apparatus (e.g., 10b of FIG. 7).

In some embodiments, the method includes contacting the lower surface of a bottom-most adhesive strip of the apparatus to a surface prior to removing the topmost adhesive strip.

In some embodiments, the surface is the clothing of a healthcare provider.

DETAILED DESCRIPTION OF THE INVENTION

Figure 1:
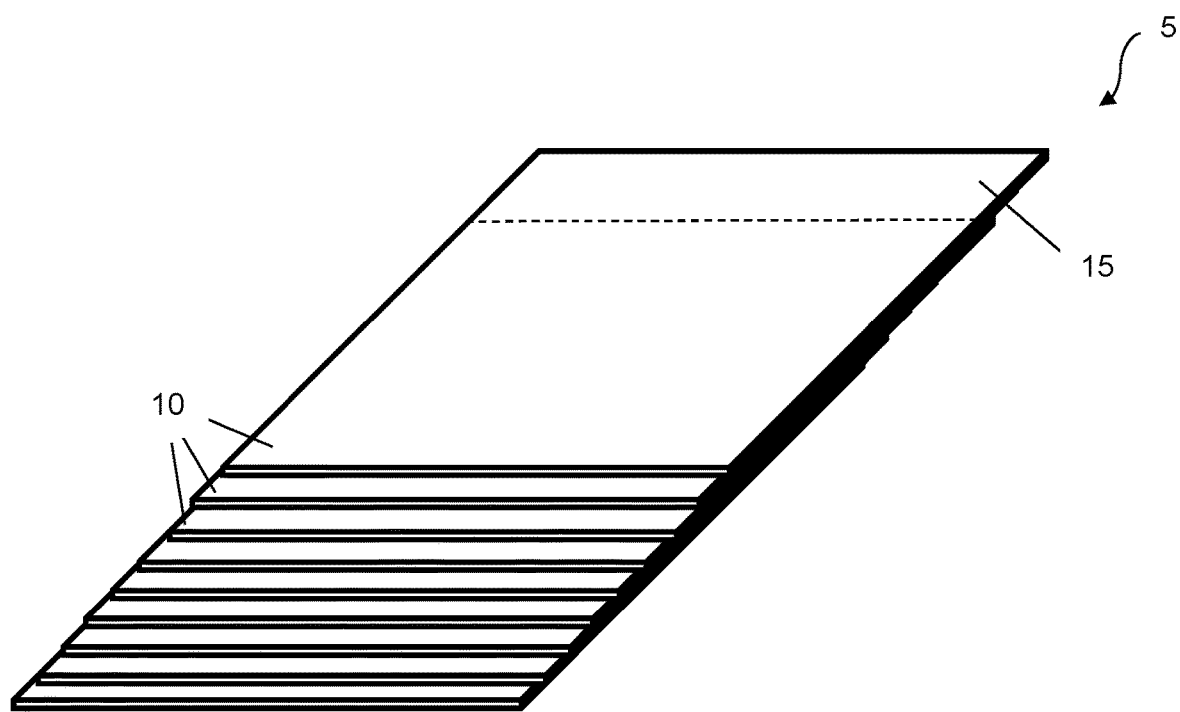
FIG. 1 is a perspective view of an apparatus comprising a plurality of preformed (e.g., folded in advance) adhesive strips that are easily accessible by a user in accordance with some embodiments of the presently disclosed subject matter.

For the purposes of promoting an understanding of the principles of the present disclosure, reference will now be made to preferred embodiments and specific language will be used to describe the same. It will nevertheless be understood that no limitation of the scope of the disclosure is thereby intended, such alteration and further modifications of the disclosure as illustrated herein, being contemplated as would normally occur to one skilled in the art to which the disclosure relates.

Articles "a" and "an" are used herein to refer to one or to more than one (i.e., at least one) of the grammatical object of the article. By way of example, "an element" means at least one element and can include more than one element. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise indicated, all numbers expressing quantities of components, conditions, and so forth used in the specification and claims are to be understood as being modified in all instances by the term "about." Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments +/−20%, in some embodiments +/−10%, in some embodiments +/−5%, in some embodiments +/−1%, in some embodiments +/−0.5%, and in some embodiments +/−0.1%, from the specified amount, as such variations are appropriate in the disclosed packages and methods. Thus, the term "about" is used to provide flexibility to a numerical range endpoint by providing that a given value may be "slightly above" or "slightly below" the endpoint without affecting the desired result.

As used herein, the term "and/or" includes any and all combinations of one or more of the associated listed items.

Relative terms such as "below" or "above" or "upper" or "lower" or "horizontal" or "vertical" may be used herein to describe a relationship of one element, layer, or region to another element, layer, or region as illustrated in the drawing figures. It will be understood that these terms and those discussed above are intended to encompass different orientations of the device in addition to the orientation depicted in the drawing figures.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any unclaimed element as essential to the practice of the invention.

Unless otherwise defined, all technical terms used herein have the same meaning as commonly understood by one of ordinary skill in the art to which this disclosure belongs.

The presently disclosed subject matter is directed to an apparatus that allows individual adhesive strips to be easily and efficiently accessed by a medical professional. Specifically, FIG. 1 illustrates one embodiment of apparatus 5 defined by a series of pre-formed adhesive strips 10. As shown, the strips are offset and overlayed, providing for easy access by a user. In addition, each strip includes fold 15 that allows a medical professional to grasp an individual adhesive strip, remove it from the adjacent strip, and use it for a particular application. When an additional adhesive strip is needed, the medical professional can repeat the process with the next (e.g., topmost) adhesive strip until all of the strips have been used.

Figure 2A:
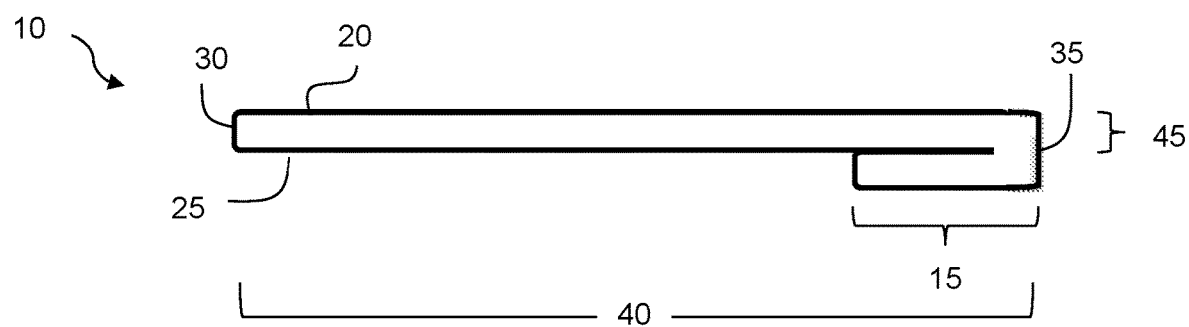
FIG. 2a is a side plan view of an adhesive strip in accordance with some embodiments of the presently disclosed subject matter.

FIG. 2a illustrates one embodiment of adhesive strip 10. As illustrated, each strip includes non-adhesive top side 20 and opposed adhesive bottom side 25. Each strip also includes first end 30 and opposed second end 35 that includes fold 15. The fold is formed by joining two portions of the adhesive side 25 together to form a non-adhesive section (e.g., a portion of the non-adhesive top side on the top and bottom surface) that can easily be grasped by a user to remove a single adhesive strip from the adjacent adhesive strip using an upward pulling motion, as discussed below. In some embodiments, the fold is permanent and cannot be "unfolded."

Figure 2B:
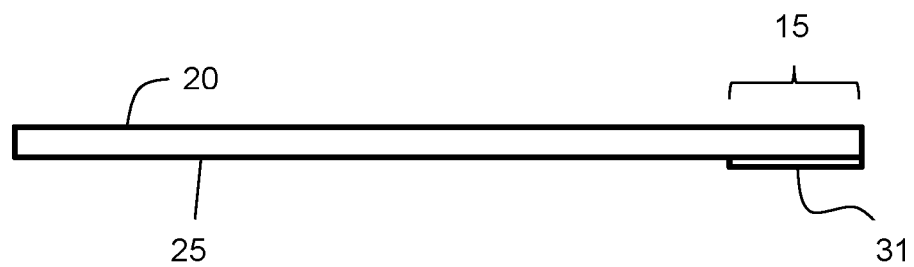
FIG. 2b is a side plan view of an adhesive strip comprising a liner in accordance with some embodiments of the presently disclosed subject matter.

Alternatively, the fold can include liner 31 or any other non-adhesive material positioned at one end of the strip, as shown in FIG. 2b. The liner comprises a flexible, thin, elongated backing layer in the shape of a long strip. Any suitable type of backing layer can be used, including those that are commercially available. Examples of backing layers (also sometimes referred to as backing laminates, backing films, etc.) that could be used include polymeric films of polyester, polypropylene, polyethylene, ethylene/vinyl acetate copolymers, polyvinyl chloride, polyvinyl acetate, polyurethane, paper, foams, non-woven fabric, or woven cloth. However, the folded embodiment of FIG. 2a may be advantageous over embodiments comprising liner 31. For example, strips comprising a fold can be immediately used without having to remove the liner. In addition, there is no chance of the liner being prematurely removed and interfering with proper positioning with fold 15. Further, the fold is more secure than a liner.

As set forth above, each adhesive strip includes adhesive bottom side 25. The term "adhesive" refers to any material that unites or bonds two surfaces together. Suitable adhesive materials can include (but are not limited to) pressure sensitive adhesives, heat activated adhesives, and the like.

Thus, the adhesive can be selected from acrylic adhesive, hot melt adhesive, a structural adhesive, a silicone based adhesive, polyvinylmethyl ether and/or its copolymers, polyacrylates and/or their copolymers, polymethacrylates and/or their copolymers, polyacrylic acid and/or its copolymers, styrenic rubbers, polyvinylpyrrolidone and/or its copolymers, polyvinyl alcohol and/or its copolymers, polyurethanes, polyolefins, and combinations thereof. Any adhesive material or combination of materials can be used.

In some embodiments, the adhesive can be configured as a skin-adhering adhesive. Examples of adhesive materials can include (but are not limited to) acrylic adhesives, silicone adhesives, elastomeric (rubber-based) adhesives, block copolymer adhesives, polyisobutene adhesives, urethane adhesives, polybutadiene adhesives, poly(ethylene-vinyl acetate) (PEVA) adhesives, polyvinyl ether adhesives, and hydrocolloids and gelatins such as karaya gum, guar gum, collagen, polysaccharide gum, locust bean gum, powdered pectin, gelatin, carboxymethyl cellulose, etc. In some embodiments, the adhesive material provides a fluid-resistant seal for the adhesive strip. A skin-adhering adhesive is configured to easily attach and remain attached to the skin of a patient, but can be removed with the application of light pressure without injuring or tearing the skin.

As set forth above, the disclosed adhesive strip also includes non-adhesive top side 20. The term "non-adhesive" refers to a material that has low or no affinity for binding or adhering to another surface (e.g., the user's skin, medical tubing, medical devices, etc.). Suitable non-adhesive materials can include (but are not limited to) any of a wide variety of materials, such as polyester, nylon, carbon, polyolefin, fabric, polypropylene, paper, or combinations thereof.

In some embodiments, adhesive material can be sprayed or fused onto the bottom side of the adhesive strip to confer the adhesive quality.

In some embodiments, the top side, bottom side, or both the top and bottom sides of adhesive strip 10 are sterile. The term "sterile" refers to the characteristic of being free from infectious agents including bacteria, viruses, and bioactive RNA or DNA. For example, the sterile strip can be about 90-100% free from the cited infectious agents (e.g., at least/no more than about 90, 91, 92, 93, 94, 95, 96, 97, 98, 99, 99.9, or 100%). In other embodiments, the adhesive strip is not sterile.

Figure 2C:
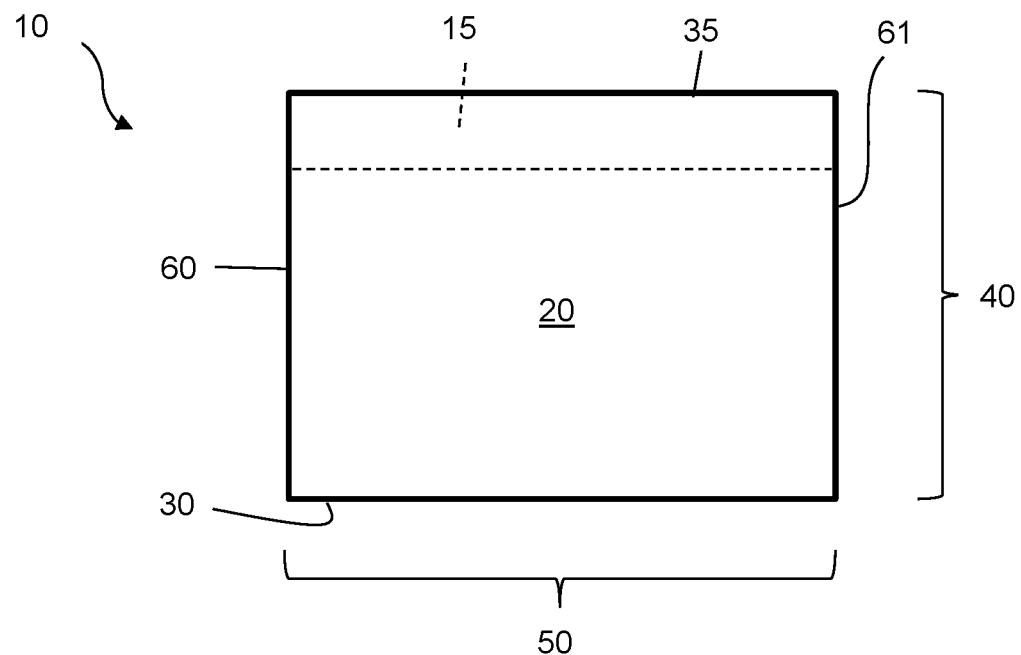
FIG. 2c is a top plan view of a adhesive strip in accordance with some embodiments of the presently disclosed subject matter.

As shown in FIG. 2c, each adhesive strip 10 includes length 40 of about 0.5-6 inches (e.g., at least/no more than about 0.5, 1, 1.5, 2, 2.5, 3, 3.5, 4, 4.5, 5, 5.5, or 6 inches). The term "length" refers to the longest straight line distance from first end 30 to second end 35. Each adhesive strip can further include thickness 45 of about 0.01 to 0.5 inches in some embodiments. Thus, adhesive strip 10 can include thickness of at least about (or no more than about) 0.01, 0.05, 0.1, 0.15, 0.2, 0.25, 0.3, 0.35, 0.4, 0.45, or 0.5 inches. The term "thickness" refers to the longest straight-line distance between the top and bottom sides 20, 25. As shown in FIG. 2c, adhesive strip 10 can further include width 50 of about 0.5-6 inches (e.g., at least/no more than about 0.5, 1, 1.5, 2, 2.5, 3, 3.5, 4, 4.5, 5, 5.5, or 6 inches). The term "width" refers to the longest straight line distance between side edges 60, 61. It should be appreciated that adhesive strip 60 can be configured with any desired dimensions and are not limited to the ranges given above.

Each adhesive strip can be configured in any desired shape, such as (but not limited to) square, rectangular, triangular, diamond, pentagonal, hexagonal, heart-shaped, abstract, and the like. It should be appreciated that any shape can be used.

As noted above, each adhesive strip includes fold 15. The fold facilitates removal of the adhesive strip from the adjacent adhesive strip so that it can be used. The fold also can help a medical professional easily remove an adhesive strip after use (e.g., from a patient's skin, tubing, and the like). In some embodiments, the fold can include a visible indication that visibly differentiates it from the main body of the adhesive strip. For example, the fold can be in a different color, pattern, or texture compared to the remainder of strip 10.

Figure 3A:
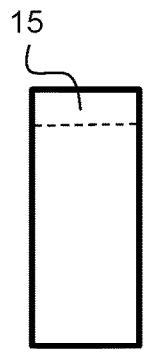
FIGS. 3a-3c are top plan views of adhesive strips comprising a folded edge in accordance with some embodiments of the presently disclosed subject matter.
Figure 3B:
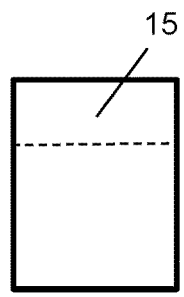
Figure 3C:
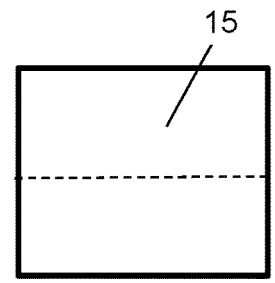

In some embodiments, the fold makes up about 1-50 percent of the total surface area of the strip (e.g., at least/no more than about 1, 5, 10, 15, 20, 25, 30, 35, 40, 45, or 50 percent), as shown in the embodiments of FIGS. 3a-3c.

Figure 4A:
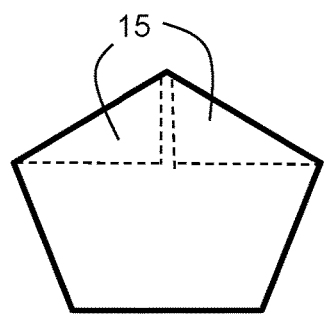
FIGS. 4a and 4b are top plan views of adhesive strips comprises a folded corner in accordance with some embodiments of the presently disclosed subject matter.
Figure 4B:
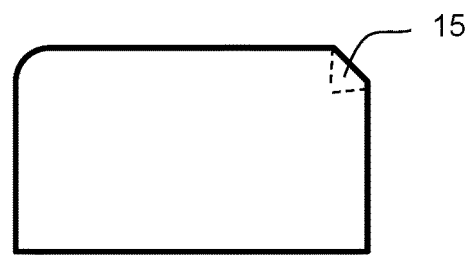

In some embodiments, the fold is configured with the same width as the rest of the strip (e.g., as shown in FIGS. 3a-3c). However, the presently disclosed subject matter is not limited and fold 15 can be configured to cover only a portion of the width of the strip, as illustrated in FIGS. 4a and 4b. In these embodiments, the strip can include a corner or other portion of the strip that is folded over upon itself as described above.

Figure 5A:
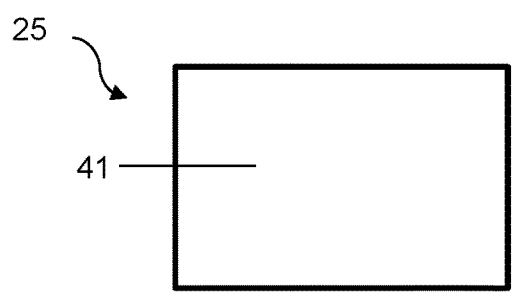
FIGS. 5a and 5b are bottom plan views of an adhesive strip in accordance with some embodiments of the presently disclosed subject matter.
Figure 5B:
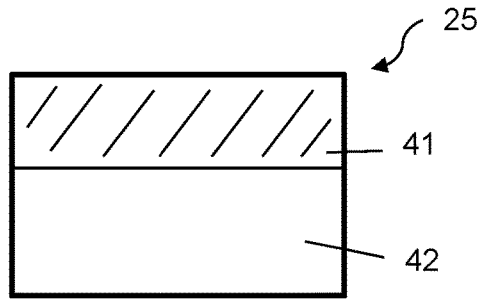

As set forth above, bottom side 25 of the adhesive strip comprises an adhesive material. In some embodiments, about 100 percent of the surface area of bottom side 25 comprises adhesive material, as shown in FIG. 5a. Alternatively, the bottom side can comprise a portion of adhesive material 41 and a portion of non-adhesive material 42, as shown in FIG. 5b. The surface area of the bottom side of strip 10 can therefore comprise about 10-100 percent adhesive material.

Figure 6A:
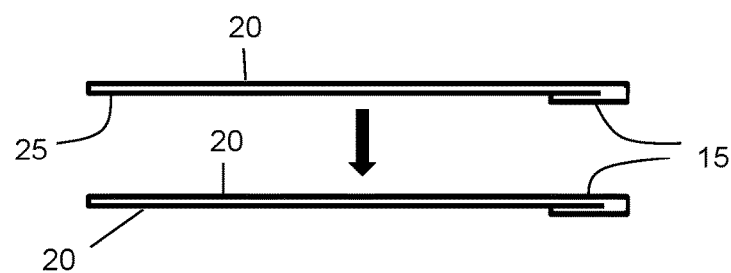
FIGS. 6a and 6b illustrate one embodiments of positioning two adjacent adhesive strips together to form the apparatus.
Figure 6B:
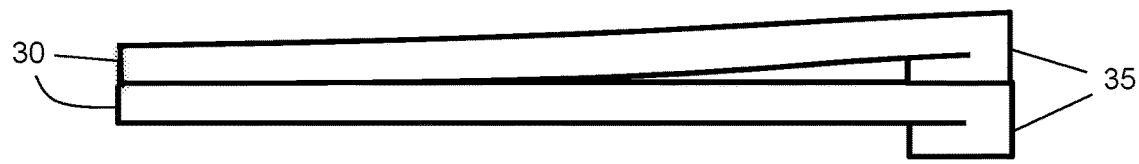

To form apparatus 5, a plurality of adhesive strips 10 are overlayed on top of the previous adhesive strip. The adhesive material on the bottom side of each strip functions to temporarily adhere that particular strip to the top non-adhesive top side of the previous strip as shown in FIGS. 6a and 6b. Thus, each adhesive strip is separated from adjacent strips by fold 15 which are not attached or joined to other strips. The process is repeated for a desired number of adhesive strips 10. In some embodiments, the disclosed apparatus can include about 5-50 strips or more (e.g., at least/no more than about 5, 10, 15, 20, 25, 30, 35, 40, 45, or 50 strips).

Figure 7:
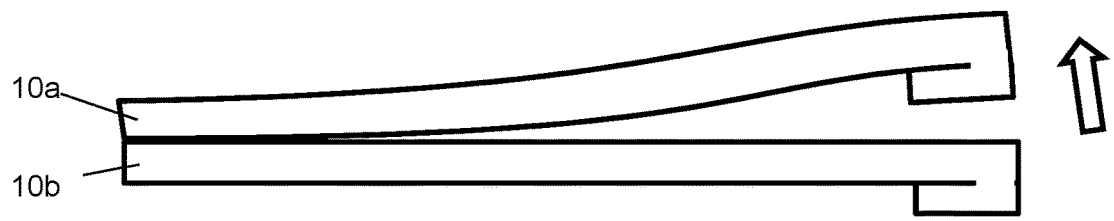
FIG. 7 illustrates one embodiment of removing an uppermost adhesive strip from an apparatus in accordance with some embodiments of the presently disclosed subject matter.

After a desired number of adhesive strips are positioned together to form apparatus 5, the device can be adhered to any desired surface, allowing the medical professional access to the individual strips. For example, the first strip (the bottom-most strip of the apparatus) can be adhered to a work surface (e.g., a desk, patient bed, the wall), to the body of the medical professional (e.g., their arm or leg), or to any other desired surface. As strips are needed for a particular patient, the medical professional can easily grasp fold 15 of the top-most strip. The user can then peel the upper strip 10a from the adjacent adhesive strip 10b using a light upward pulling motion. In response to the pulling motion, the bottom adhesive surface 25 of strip 10a separates from the top non-adhesive surface 20 of adjacent strip 10b, as shown in FIG. 7. The process is repeated with successive strips until all the strips are needed.

Figure 8:
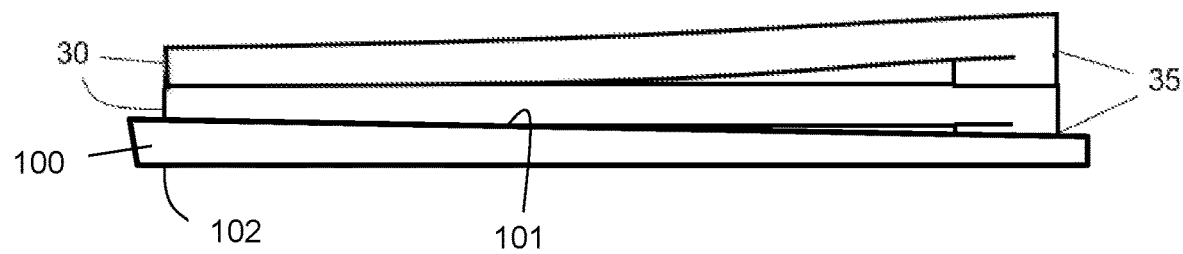
FIG. 8 is an apparatus comprising a lower support in accordance with some embodiments of the presently disclosed subject matter.

In some embodiments, the bottom-most strip can be adhered to support 100 that can be used on a particular surface. For example, as shown in FIG. 8, the support can include a double-sided adhesive (e.g., the top and bottom surfaces 101, 102 are adhesive allowing the adhesive strips to remain secured to the support and allow the bottom surface of the support to attach to a surface). The adhesive used on the bottom surface of the support can be stronger than the adhesive used on the strips to ensure that the apparatus remains stationary. Thus, the bottom surface of the support can be attached to a wall, a desk, table, or other item. The medical professional then has the plurality of strips readily accessible.

When a strip is ready to be removed, it is peeled off the patient's skin or other surface by lifting up the fold and peeling the adhesive strip away. It can then be discarded using normal methods.

The term "medical professional" refers to a person that is involved in the practice of medicine. Suitable medical professionals can include (but are not limited to) nurses, nurse's aides, doctors, surgeons, nursing home nurses, home healthcare workers, and the like. In some embodiments, the medical professional can be associated with human healthcare and/or veterinary care. It should be appreciated that the instant disclosure describes use of apparatus 5 in the medical field, the presently disclosed subject matter is not limited and the disclosed apparatus can be used in any field.

The term "patient" as used herein can refer to a human. Specific examples of patients include (but are not limited to) individuals requiring medical assistance, individuals with limited function, individuals that have undergone or will undergo surgery, individuals that have undergone or will undergo a medical procedure, individuals that are being treated for a disease or disorder, individuals that have an injury that they are being treated for, and the like. In some embodiments, the patient can be an animal, such as a dog, cat, horse, etc.

In some embodiments, each strip is overlayed to match the shape of the preceding strip, as shown in FIG. 6b. In other embodiments, the strips are offset (as shown in the embodiment of FIG. 1) to make grasping of fold 15 easier. The area of overlap can be about 0.1-1 inch (e.g., at least/no more than about 0.1, 0.2, 0.3, 0.4, 0.5, 0.6, 0.7, 0.8, 0.9, or 1 inch).

The disclosed apparatus provides many advantages over prior art devices. For example, apparatus 5 allows medical professionals to access adhesive strips easily and conveniently as needed during patient care. Instead of having to locate a source of tape, remove a desired amount of tape, and then avoid the sticky side from touching undesired surfaces, the user can quickly pull of an adhesive strip and use it directly.

Apparatus 5 also saves valuable time of the medical professional, allowing them to spend more time with patients.

The disclosed apparatus prevents the sticky side of an adhesive strip from being prematurely adhered to an undesired surface. In comparison, the disclosed apparatus allows the adhesive side to be covered by the adjacent adhesive strip, preventing premature sticking to a surface.

Folded edge 15 allows the adhesive strip to be easily removed from apparatus 5. The folded edge also enables the medical professional to easily remove the strip when it is no longer needed (e.g., after a procedure has been performed).

The foregoing description and examples have been set forth merely to illustrate the invention and are not intended to be limiting. Each of the disclosed aspects and embodiments of the invention may be considered individually or in combination with other aspects, embodiments, and variations of the invention. In addition, unless otherwise specified, the steps of the methods of the invention are not confined to any particular order of performance. Modifications of the disclosed embodiments incorporating the spirit and substance of the invention may occur to persons skilled in the art, and such modifications are within the scope of the invention.

What is claimed is:

1. A stacked product comprising:
   a plurality of pre-formed adhesive strips, wherein each one of the plurality of pre-formed adhesive strips comprises a backing with an upper non-adhesive surface and an opposed lower surface comprising an adhesive material;
   wherein the backing has side edges, a front edge, and a rear edge opposed to the front edge, wherein the rear edge comprises a fold in the backing that is non-adhesive on all exterior faces of the fold;
   wherein each one of the plurality of pre-formed adhesive strips is overlaid on an adjacent adhesive strip in the plurality of adhesive strips such that the adhesive material on the lower surface of one backing contacts and adheres to the upper non-adhesive surface of an adjacent backing but the folds of the backings are not adhered together; and
   a support positioned on a bottom-most adhesive strip of the stacked product, the support comprising an upper adhesive surface and an opposed lower adhesive surface, whereby the upper adhesive surface is attached to the lower surface of the bottom-most adhesive strip of the stacked product;
   wherein the support has a first end oriented towards the rear edge of each of the plurality of adhesive strips and an opposed second end oriented towards the front edge of each of the plurality of adhesive strips, the first end having a first thickness between the upper adhesive surface and the lower adhesive surface of the support, and the second end having a second thickness between the upper adhesive surface and the lower adhesive surface of the support, wherein the first thickness is less than the second thickness.

2. The stacked product of claim 1, wherein the side edges of each adhesive strip are aligned with the side edges of each adjacent adhesive strip.

3. The stacked product of claim 1, wherein the fold in the backing of each adhesive strip extends along the width of each adhesive strip.

4. The stacked product of claim 1, wherein the fold in the backing of each adhesive strip is permanent.

5. The stacked product of claim 1, wherein the fold in the backing of each adhesive strip is formed by joining a portion of the adhesive material on the lower surface of the backing to another portion of the adhesive material on the backing.

6. The stacked product of claim 1, wherein each adhesive strip is sterile.

7. The stacked product of claim 1, wherein each adhesive strip comprises a length of about 0.5-6 inches, a width of about 0.5-6 inches, and a thickness of about 0.01-0.5 inches.

8. The stacked product of claim 1, wherein the fold in the backing of each adhesive strip makes up about 1 percent of a total surface area of each adhesive strip.

9. The stacked product of claim 1, wherein the fold in the backing of each adhesive strip makes up about 1-50 percent of a total surface area of each adhesive strip.

10. The stacked product of claim 1, comprising 50 or more adhesive strips.

11. A method of providing a series of adhesive strips for use on demand, the method comprising:
    grasping the tab of a topmost adhesive strip of the stacked product of claim 1;

applying pressure and pulling in an upward motion to break a bond between the adhesive material on the lower surface of the topmost adhesive strip and the upper non-adhesive surface of the adjacent adhesive strip, thereby separating the topmost adhesive strip from the stacked product;

applying the separated adhesive strip to a substrate.

12. The method of claim 11, further comprising contacting the lower adhesive surface of the support of the stacked product to a surface prior to removing the topmost adhesive strip.

13. The method of claim 12, wherein the surface is the clothing of a healthcare provider.

14. The method of claim 11, wherein each adhesive strip comprises a length of about 0.5-6 inches, a width of about 0.5-6 inches, and a thickness of about 0.01-0.5 inches.

15. The method of claim 11, wherein the fold in the backing of each adhesive strip makes up about 1 percent of a total surface area of each adhesive strip.

16. The method of claim 11, wherein the fold in the backing of each adhesive strip makes up about 1-50 percent of a total surface area of each adhesive strip.

17. The method of claim 11, wherein the stacked product comprises 50 or more adhesive strips.

* * * * *